United States Patent [19]

Tanaka

[11] 4,059,242
[45] Nov. 22, 1977

[54] SAFETY BELT RETRACTOR

[75] Inventor: Akira Tanaka, Northridge, Calif.

[73] Assignee: American Safety Equipment Corporation, Encino, Calif.

[21] Appl. No.: 688,188

[22] Filed: May 20, 1976

[51] Int. Cl.² .................... A62B 35/02; B65H 75/48
[52] U.S. Cl. ......................... 242/107.4 A; 242/107.7
[58] Field of Search ................ 242/107.4 R, 107.4 E; 297/388; 280/744–747

[56] References Cited

U.S. PATENT DOCUMENTS

| 3,836,171 | 9/1974 | Hayashi et al. | 242/107.4 R |
| 3,901,459 | 8/1975 | Romanzi et al. | 242/107.4 A |
| 3,923,269 | 12/1975 | Kell | 242/107.4 A |
| 3,930,622 | 1/1976 | Tanaka et al. | 242/107.4 A |

Primary Examiner—Stanley N. Gilreath
Assistant Examiner—John M. Jillions
Attorney, Agent, or Firm—Poms, Smith, Lande & Glenny

[57] ABSTRACT

Improvements in a safety belt retractor having a locking pawl and a first ratchet engageable by the locking pawl for locking a belt storage reel against unwinding movement and an actuating pawl associated with means responsive to an emergency condition. The improvements include an intermediate actuating member movably mounted between the locking pawl and the actuating pawl resiliently engaging the locking pawl and adapted to cause the locking pawl to engage the first ratchet to lock the reel when the actuating member is actuated upon an emergency condition.

8 Claims, 6 Drawing Figures

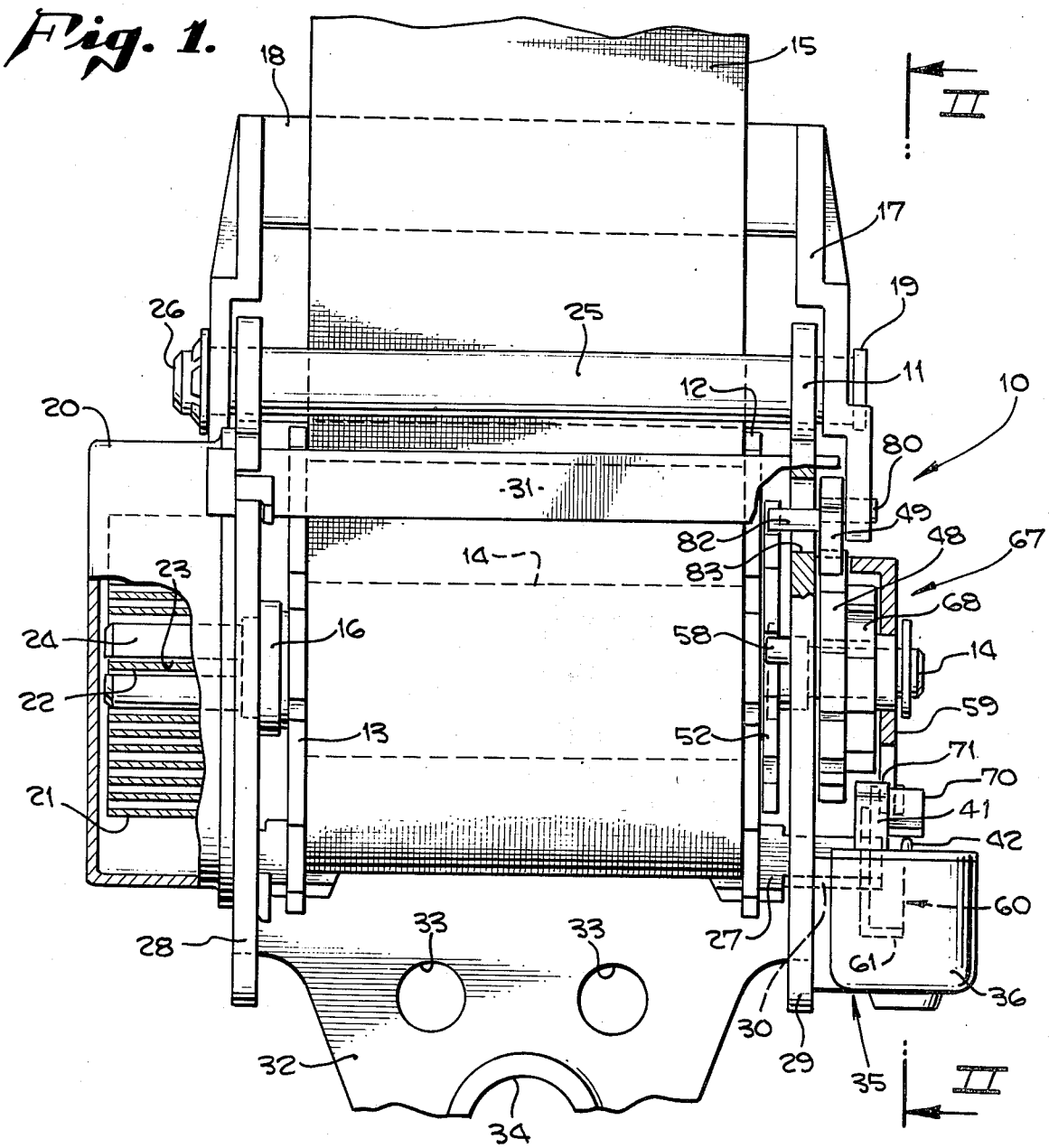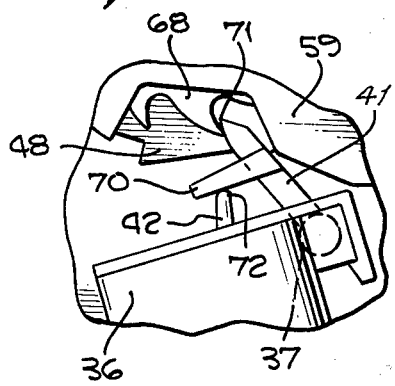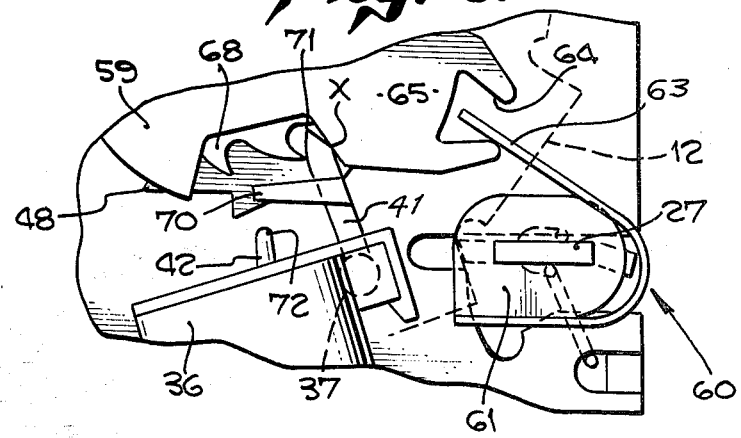

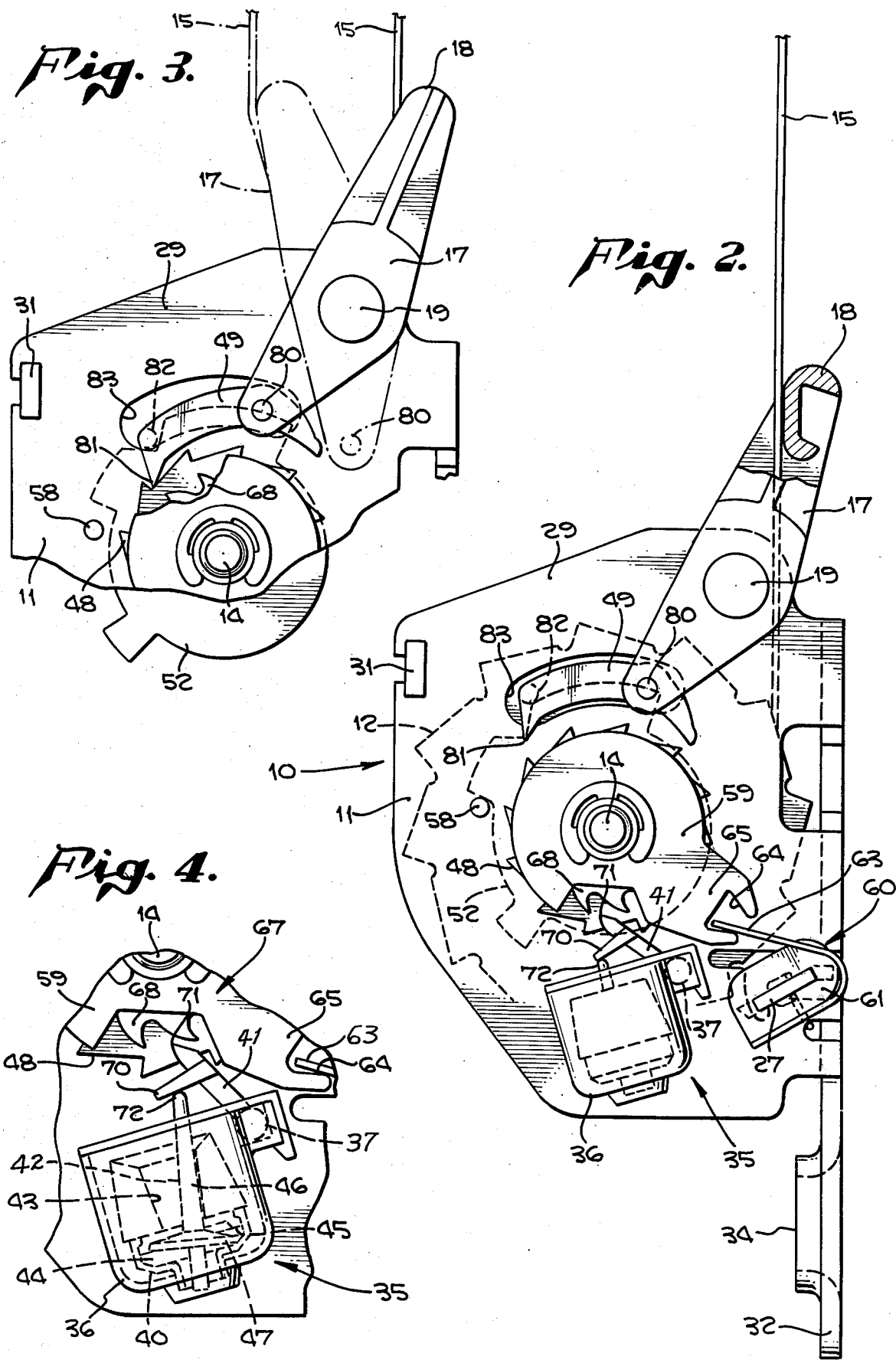

SAFETY BELT RETRACTOR

BACKGROUND OF THE INVENTION

1. Field of the Invention

The invention relates to safety belt retractors; and, more particularly, to emergency sensing retractors having improved pawl locking means.

2. Description of the Prior Art

Safety belt retractors which utilize energy derived from a rotating shaft for moving a pawl into engagement with a ratchet wheel mounted on a shaft are known in the prior art, such as the inertia reel mechanism described and claimed in U.S. Pat. No. 3,578,260 to Kell. In this prior art device, a pendulum is arranged to cause a subsidiary pawl to move from a first position in which it is out of engagement with a subsidiary ratchet wheel mounted on a reel to a second position in which it engages the subsidiary ratchet wheel, rotation of the reel in the direction resisted by the main pawl when the subsidiary pawl is in its second position being operative to move the subsidiary pawl from its second position to a third position. Movement of the subsidiary pawl from its second position to its third position is arranged to cause the main pawl to move from a first position in which it engages in one direction and a second position in which it does not engage.

Such prior art retractors lock up in a manner whereby tip to tip engagement of the lockbars with the ratchet wheels might take place which would result in "tooth skipping". Further, such prior art retractors are relatively noisy in operation. Thus, it is necessary that a retractor of such type have means for compensating for tolerances introduced into such retractors during manufacture and assembly so that they positively lock up without "tooth skipping" in a relatively quiet manner.

SUMMARY OF THE INVENTION

It is an object of this invention to provide an improved safety belt retractor with emergency sensing lock-up provisions.

It is a further object of this invention to provide a safety belt retractor which avoids "tooth skipping" during lock-up.

It is still further an object of this invention to provide a safety belt retractor which is relatively quiet in operation.

These and other objects are preferably accomplished by providing a safety belt retractor having a locking pawl and a first ratchet engageable by the locking pawl for locking a belt storage reel against unwinding movement and an actuating pawl associated with means responsive to an emergency condition. The improvements include an intermediate actuating member movably mounted between the locking pawl and the actuating pawl resiliently engaging the locking pawl and adapted to cause the locking pawl to engage the first ratchet to lock the reel when the actuating member is actuated upon an emergency condition.

BRIEF DESCRIPTION OF THE DRAWING

FIG. 1 is a vertical view, partly in section, of an inertia actuated reel in accordance with the invention;

FIG. 2 is a side view of the reel of FIG. 1 taken along plane II—II thereof showing the belt extended therefrom;

FIG. 3 is a side view, similar to FIG. 2, showing, in a partial view thereof, the operation of the reel locking mechanism of the reel of FIG. 1; and FIGS. 4 through 6 are detailed views of the reel of FIG. 1 showing various positions of the locking mechanism during lock-up of the reel of FIG. 1.

DESCRIPTION OF THE PREFERRED EMBODIMENT

Referring now to FIG. 1 of the drawing, a belt storing reel 10 in accordance with the invention is shown and includes a frame 11 and a pair of first ratchet wheels 12, 13 (see also FIG. 2) mounted on opposite sides of a main shaft 14. Wheels 12, 13 are fixedly secured to and coaxially attached to shaft 14. Webbing 15 winds and unwinds about shaft 14 so that it can be selectively retracted from and wound into reel 10 as is well known in the art.

Shaft 14 is journalled for rotation within frame 11 by means of bearings 16 (only one visible in FIG. 1) disposed on each end of shaft 14 and rotatably mounted within frame 11.

As can be seen in FIG. 2, webbing 15 is in its extended position and passes through a tension arm 17 having a webbing guiding member 18 thereon for providing a limited low tension travel of webbing 15, which webbing may be of nylon or other suitable material, while the reel 10 is locked against a retractive movement as discussed in detail in a pending application to Ulrich, Ser. No. 627,875, filed Oct. 31, 1975, commonly assigned, the teachings of which are incorporated herein by reference. Reference should be made to the pending Ulrich application for a complete understanding of the tension relieving means disclosed therein. Arm 17 is pivotally connected to frame 11 by a pivot pin 19.

As shown in FIG. 1, a conventional spring cup assembly 20 is shown mounted on one side of frame 11. Assembly 20 houses therein a suitable torsion spring 21 or the like having an inner end 22 inserted into a slot 23 on a reduced end 24 of shaft 14 (extending into housing 20) to normally wind in or retract webbing 15 as is also well known in the art. Wheels 12, 13 act as guides for webbing 15 as it is pulled out of reel 10. A support member 25 is disposed on frame 11 extending across reel 10 between the sides forming frame 11 with webbing 15 extending under member 25. Thus, member 25 acts as both a frame support and a guide for webbing 15. Member 25 is retained in position by suitable end caps 26.

Locking pawl means in the preferred form of an elongated lockbar 27 engageable with ratchet wheels 12, 13 is mounted on frame 11. The sidewalls 28, 29 of frame 11 include suitable openings therein with lockbar 27 being longer than the overall width of frame 11 and having reduced ends 30 extending out of such openings as is well known in the art. A bracket member 31 extends across frame 11 between sidewalls 28, 29 and is secured thereto. As can be seen in FIG. 1, a backing plate 32 having suitable apertures 33, 34 therein is mounted on frame 11 between sidewalls 28, 29 for mounting reel 10 at any desired location, such as on a vehicle or the like.

As is well known in the art, emergency sensing means 35 may be provided on reel 10 which includes a movable actuator movable in response to emergency conditions, such as an accident or the like. Such sensing means 35 may include a housing 36 including a suitable inertia responsive mass to move under predetermined inertia conditions. Housing 36 is mounted to a sidewall 29 of frame 11, as can be seen in FIG. 4. A suitable inertia sensing mechanism having an inner actuating shaft (hereinafter called actuator 42) is described and claimed in U.S. Pat. No. 4,018,400 to Henderson, filed Aug. 11, 1975, the teachings of which are incorporated herein by reference, also commonly assigned.

As particularly contemplated in the present invention, actuating pawl means 41 are provided in association with the emergency sensing means 35 for movement between positions in response to movement of the sensing means 35. Thus, sensing means 35 may include a movable actuator 42 (see FIG. 4) therein which moves when emergency sensing means 35 is actuated in an emergency condition warranting reel lockup. As described in said U.S. Pat. No. 4,018,400 an inertia mass and support cup 40 may include a first upper chamber 43 and a wider lower chamber 44 with an abutment shoulder 45 separating chamber 43 from chamber 44. The mass and support cup 40 is open at the top and bottom and thus receives movable actuator 42 therein. Actuator 42 includes a central elongated shaft 46, which may be tapered as shown, having a disc-like generally conically shaped body portion 47 press-fit or the like on shaft 46. Body portion 47 is disposed in lower chamber 44, its upward movement stopped by shoulder 45. Shaft 46 extends through both upper and lower chambers 43, 44 and may extend out the bottom of cup 40.

Before discussing actuating means 41 further, the aforementioned copending application to Ulrich, the teachings of which are incorporated hereby by reference, discloses a ratchet and friction disc arrangement engageable by a pawl as part of the tension relieving means. In the instant invention, a ratchet wheel 48 is centrally mounted and keyed to shaft 14 for rotation therewith. An actuating pawl 49 is pivotally mounted via pivot pin 80 to arm 17. Pawl 49 is provided with a pawl tip 81 adapted to engage the teeth of ratchet wheel 48 when allowed to fall by gravity into engagement therewith. Movement of pawl 49 is limited by limit pin 82 which rides within slot 83 formed in sidewall 29. As discussed in detail in copending application Ser. No. 627,875 to Ulrich, the teachings of which are incorporated herein by reference, the engagement and disengagement of pawl 49 with wheel 48 is controlled by trip means acting on pin 82 by the frictionally driven cam follower 52 rotating within the limits allowed by pin 58. Further discussion is deemed unnecessary for purposes of the instant application. Reference should be made to the copending Ulrich application for a more detailed discussion of the webbing tension relieving means described in detail therein.

As particularly contemplated in the present invention, an intermediate actuating member 59 is provided between the actuating pawl means 41 and the locking pawl means 12, 13 and 27. Means are also provided for movably mounting actuating member 59. In the exemplary embodiment, such actuating member 59 is a lever arm and such means for movably mounting it includes lever arm 59 being pivotally mounted to shaft 14 for rotation about the axis of reel 10. The exemplary embodiment of the invention, also includes means providing a resilient connection between arm 59 and lockbar 27 to compensate for minor discrepancies in the mating of the lockbar 27 of the locking pawl means to the ratchet wheels 12, 13 upon lockup of the reel. Such resilient means, in the exemplary embodiment of the invention, includes leaf spring arm means 60 mounted to a flange 61 having one end 30 of lockbar 27 fixedly secured therein. Lockbar 27 may be normally biased via spring 60 encircling the same and retained in frame 11 normally biasing lockbar 27 out of locking engagement with ratchet wheels 12, 13. Leaf spring arm means 60 includes one end 63 extending from flange 61 into an opening 64 formed in an extension portion 65 of lever arm 59, portion 65 opening and extending toward locking pawl 27. In this manner, a resilient connection is provided between arm 59 and the locking pawl means 12, 13, 27.

Means indicated generally at 67 in FIG. 4 are also provided and associated with the sensing means 35 for moving an actuating or a subsidiary pawl from a first position out of engagement with a subsidiary ratchet wheel to a second position into engagement therewith. Such means 67 includes the subsidiary ratchet wheel 68 which is of smaller diameter than wheel 48 and is keyed to ratchet wheel 48 for rotation therewith. The actuating pawl 41, which may be considered a subsidiary pawl is pivotally mounted on pivot pin 37 on sensing means 35. Pawl 41 includes a protruding lip or extension portion 70 and a pawl tooth 71 adapted to engage the teeth of wheel 68. If pawl 41 is rotated in a clockwise direction as seen in FIG. 2, tooth 71 is moved into a position to engage wheel 68. As shown in FIGS. 2 and 4, actuator 42 includes a tip 72 bearing against the undersurface of extension portion 70. As will be discussed, when actuator 42 is deflected upon actuation of the mass-cup 40 of sensing means 35, tip 72 moves portion 70 from the FIG. 2 to the FIG. 4 position to be in a position for tooth 71 to engage the teeth of wheel 68.

Referring now to FIGS. 2 through 6, in operation, if housing 36 is decelerated in the left to right direction, actuator 42 will be deflected as can be seen by comparing FIGS. 2 and 4. Deflection of actuator 42 causes the tip 72 to move extension portion 70 and thus tooth 71 of subsidiary pawl 41. Under these conditions, the tooth 71 is in position such that it can engage with ratchet wheel 68.

If tension is applied to webbing 15, reel 10 will tend to rotate in a counterclockwise direction in FIGS. 2 and 4. Almost immediately, one of the teeth of wheel 68 engages tooth 71 as shown in FIG. 5. Further unwinding of webbing 15 from reel 10 causes the wheel 68 to move pawl 41 thereby pushing pawl 41 against lever arm 59 at point x as seen in FIG. 6. Further movement of ratchet wheel 68 pushes lever arm 59 in the counterclockwise direction of FIG. 6. Extension portion 65 moves end 63 of leaf spring arm means 60 which moves lockbar 27 against its normal spring bias into locking engagement with the main ratchet wheels 12 and 13 as shown in FIG. 6. Thus, further rotation of the reel 10 and further unwinding of webbing 15 is prevented.

When deceleration ceases, actuator 42 returns to the FIG. 2 position. The shape of the teeth of ratchet wheels 12, 13 may be such that lockbar 27 is maintained in engagement therewith until tension is removed from webbing 15.

Thus, actuating pawl means 41 is associated with the emergency sensing means 35 for movement from a first position out of unlocking engagement with ratchet wheel 68 to a second position in locking engagement therewith in response to movement of the actuator 42 of the sensing means 35 under emergency conditions, such as in a vehicular accident. The ratchet wheel 68, driven off of shaft 14, engages the pawl tip 71 when pawl 41 is moved into the second position. Such engagement drives pawl 41 toward a third position (FIG. 6) abutting against the intermediate actuating member 59.

The actuating member 59 is movably mounted, via shaft 14, between actuating pawl means 41 and the locking means 12, 13, 27, and resiliently engages lockbar 27 through the leaf spring means 60 (i.e., leaf spring end 63 — see FIG. 2) for moving lockbar 27 into reel locking engagement with the ratchet wheels 12, 13 when actuating pawl 41 pushes actuating member 59 as shown in FIG. 6 as ratchet wheel 48 is rotated via shaft 14 to thus also rotate ratchet wheel 68. The final, or fourth position of pawl 41 is when pawl 41 moves member 59 to the lockbar locking condition via member 59's engagement with lockbar 27 through leaf spring means 60.

The resilient connection between member 59 and the locking pawl means 12, 13, 27 compensates for minor discrepancies in the mating of the lockbar to the ratchet wheels 12, 13. The leaf spring means 60 includes a leaf spring arm 63 connected at one end to lockbar 27 and extending into a force transmitting engagement with the lever portion 65 of actuating member 59.

Although a pair of ratchet wheels 12, 13 have been disclosed, only a single ratchet wheel may be provided (the other wheel need not have teeth thereon and may merely provide a guide for webbing 15). Any suitable materials may be used, for example, the various larger wheels 12, 13, 48 may be of metal or the like whereas the smaller subsidiary ratchet wheel 68 may be plastic or similar material. Ratchet or pawl 41 may also be plastic.

It can be seen that I have disclosed an improved safety belt retractor that avoids "tooth skipping" during lockup under emergency conditions and is relatively quiet in operation.

I claim:

1. In an emergency locking safety belt retractor including a belt storage reel having at least one associated locking ratchet, locking pawl means for engaging said ratchet to lock said reel against belt unwinding movement and emergency sensing means including a movable actuator movable in response to an emergency condition, the improvement comprising the provision of:

actuating pawl means associated with said emergency sensing means for movement from a first to a second position in response to movement of said actuator produced by said emergency sensing means in an emergency condition warranting reel lockup;

drive means driven off of reel rotation for engaging said actuating pawl means when the latter is in said second position, said drive means then driving said actuating pawl means toward a third position; and an intermediate actuating member and means for movably mounting it operably between said actuating pawl means and said locking pawl means for moving the latter into reel locking engagement with said ratchet on movement of said actuating pawl means under the action of said drive means from said third position wherein it engages said intermediate actuating member to a fourth position wherein it has moved said intermediate actuating member to a position wherein the latter has caused said locking pawl means to engage said ratchet to lock said reel.

2. The improvement in emergency locking safety belt retractor of claim 1 wherein:

said intermediate actuating member comprises a lever arm pivotally mounted for rotation about the axis of said reel.

3. The improvement in emergency locking safety belt retractor of claim 1 wherein:

said means for mounting said intermediate actuating member operably between said actuating pawl means and said locking pawl means comprises means for providing a resilient connection between said intermediate actuating member and said locking pawl means to compensate for minor discrepancies in the mating of said locking pawl means to said ratchet upon locking of said reel.

4. The improvement in emergency locking safety belt retractor of claim 3 wherein:

said intermediate actuating means comprises a lever arm pivotally mounted to the retractor and having a portion disposed toward said locking pawl means; and said means for providing a resilient connection between said intermediate actuating member and said locking pawl means comprises a leaf spring arm means engaging said locking pawl means and having an arm portion extending into a force transmitting engagement with said lever portion.

5. In a reel having a frame, a shaft journalled for rotation in said frame, a belt having one end connected to said shaft and adapted to be wound about said shaft, spring means associated with said shaft and said frame for revolving said shaft in a direction retracting said belt about said shaft, a ratchet tooth gear mounted on said shaft and rotatable therewith, a locking pawl mounted on said frame and movable into engagement with said tooth gear, inertia responsive means mounted on said frame having a movable actuator movable in response to actuation of said inertia responsive means, the improvement which comprises:

a rotatable member mounted on said shaft for rotation relative thereto;

a resilient member operatively connected to said locking pawl extending in a direction toward said rotatable member, said rotatable member having an extension portion receiving the free end of said resilient member therein in a position whereby, upon rotation of said rotatable member, said extension portion engages said resilient member to thereby move said locking pawl interconnected thereto;

a subsidiary ratchet wheel mounted on said shaft; for rotation therewith an actuating pawl pivotally mounted on said frame in a position adapted to engage said rotatable member and having a pawl tip movable from a first position out of engagement with the teeth of said subsidiary ratchet wheel to a second position in the path of rotation of the teeth of said subsidiary ratchet wheel, and means associated with both said actuating pawl and said actuator whereby, upon movement of said actuator, said actuating pawl tip is moved into the path of rotation of said subsidiary ratchet wheel and further rotation of said subsidiary ratchet wheel, moves said actuating pawl against said rotatable member to thereby move said extension portion engaging said resilient member moving said locking pawl into reel locking engagement with said ratchet tooth gear.

6. In the improved reel of claim 5 wherein said rotatable member includes a lever arm pivotally mounted on said shaft, said extension portion including a cut-out portion opening in a direction toward said resilient member.

7. In the improved reel of claim 6 wherein said resilient member includes a leaf spring fixedly secured at one end to said locking pawl and having a free end extending into said cut-out portion for engagement by said lever arm.

8. In the improved reel of claim 5 wherein said means associated with both said actuating pawl and said actuator includes a tip on said actuator and an extension portion on said actuating pawl, said tip on said actuator bearing against the underside of said actuating pawl extension portion, said actuating pawl extension portion being configured so that, as said actuator tip moves along said actuating pawl extension portion, the tip of said actuating pawl is moved into the plane of movement of the teeth of said subsidiary ratchet wheel.

* * * * *